United States Patent [19]

Chen et al.

[11] Patent Number: 4,744,825
[45] Date of Patent: May 17, 1988

[54] REMOVAL AND RECOVERY OF SILVER FROM WASTE STREAM

[75] Inventors: Abraham S. C. Chen, Monroeville; Hubert L. Fleming, Mars, both of Pa.

[73] Assignee: Aluminum Company of America, Pittsburgh, Pa.

[21] Appl. No.: 937,682

[22] Filed: Dec. 4, 1986

[51] Int. Cl.⁴ .............................................. C22B 11/04
[52] U.S. Cl. ..................................... 75/118 R; 75/108; 423/42; 210/684; 210/686; 210/688; 210/702
[58] Field of Search ...................... 75/109, 108, 118 R, 75/118 P; 423/42; 210/702, 719, 686, 688, 684

[56] References Cited

U.S. PATENT DOCUMENTS

| | | | |
|---|---|---|---|
| 1,234,390 | 7/1917 | Renwick et al. | 423/42 |
| 1,234,391 | 7/1917 | Renwick et al. | 423/42 |
| 2,614,029 | 2/1951 | Moede | 75/118 P |
| 3,073,675 | 1/1963 | Leum et al. | 210/686 |
| 3,382,034 | 5/1968 | Kraus | 210/686 |
| 3,840,365 | 10/1974 | Hammes, Sr. et al. | 75/118 R |
| 4,082,546 | 4/1978 | Wallace | 75/118 P |

OTHER PUBLICATIONS

Sitting, Marshall, ed., "Priority Toxic Pollutants: Health Impacts and Allowable Limits", Noyes Data Corporation, Park Ridge, NJ, 1980, pp. 2-3.

*Primary Examiner*—Robert L. Stoll
*Attorney, Agent, or Firm*—Andrew Alexander; John P. Taylor

[57] ABSTRACT

In accordance with the invention, an improved process is provided for the efficient removal and recovery of silver from an impure solution containing silver ions which comprises contacting the silver-containing solution with an activated alumina adsorbent to selectively adsorb the silver ions from the solution and the lower the subsequent effluent discharge to less than 1 ppm silver, treating the activated alumina with a regeneration fluid to recover the silver ions from the adsorbent, and reducing the recovered silver ions to metallic silver.

20 Claims, 2 Drawing Sheets

REMOVAL AND RECOVERY OF SILVER FROM WASTE STREAM

BACKGROUND OF THE INVENTION

1. Field of the Invention

This invention relates to the removal and recovery of silver from an impure solution. More particularly, this invention relates to the adsorption of complexed silver ions from an impure solution and the recovery and reduction of the ions to metallic silver.

2. Description of the Related Art

Waste streams from photographic processes contain silver ions usually present in silver thiosulfate anion complexes such as $AgS_2O_3^{-1}$ or $Ag(S_2O_3)_2^{-3}$. These complexed silver ions are formed by the reaction of silver bromide with ammonium thiosulfate during the photographic development process.

Certain heavy metal ions are listed by the United States Environmental Protection Agency (EPA) as priority toxic pollutants. The heavy metal ions currently listed under EPA's priority pollutants list include silver. A discussion of the toxicity, health impacts and EPA's allowable limits for heavy metals such as silver can be found on page 2-3 in "Priority Toxic Pollutants: Health Impacts and Allowable Limits", edited by Marshall Sittig, published by Noyes Publications, Park Ridge, New Jersey in 1980.

Historically, very little attention was paid to the disposal of waste streams containing heavy metals, including those containing silver, due in part to lack of governmental regulation, and, more importantly, probably due to an overall lack of knowledge or appreciation by industry of the long term effects of industrial waste on people and the environment. Now, however, due both to the above referred to government regulations and corporate responsibility, much attention has been addressed to proper handling and disposal of waste materials classified as hazardous or toxic.

Not only has it become important to remove the silver from such waste streams for reasons of health, but the subsequent recovery of this valuable metal has also become of increased economic importance.

Three different processes have been utilized to remove silver from such waste streams. Conventional ion exchange followed by regeneration has been employed in large plants with discharges of 30 to 50 gallons per minute (gpm). An alternate regeneration or silver removal scheme may also be employed with ion exchange resins wherein an acid is added to precipitate the silver and the resin, after a number of cycles, is taken to a remote site and burned.

However, ion exchange is recognized as not being good at either meeting effluent discharge limits or exhibiting high silver recovery efficiencies. The primary reason is that the thiosulfate ion, $S_2O_3^{-2}$, is used as the counter ion and there is a high thiosulfate background in the stream. Poor equilibria is established and there is not good selectivity for the silver thiosulfate ion, $Ag(S_2O_3)^{-3}$. Also, resin costs are very high, considering that the influent streams may contain 100 to 500 ppm $Ag(S_2O_3)^{-3}$ which saturates a bed quickly.

Iron sponge cartridges have also been used, particularly in small (less than 50 gallons per week) shops, for silver removal. Silver replaces iron and forms a sludge which must be recovered extraneously. The best sponge performance is typically removal down to about 15 ppm, which is still too high for present effluent discharge limits.

The third technology which has been used for silver removal, and recovery is electrolytic reduction. Electrolytic cells do operate satisfactorily in reducing silver from solutions containing silver thiosulfate, but do not meet current effluent discharge limits with their discharge at about 100 to 500 ppm. Also, there is a high energy penalty for larger streams at lower silver concentrations.

SUMMARY OF THE INVENTION

It is, therefore, an object of this invention to provide an efficient process for removing sufficient silver ions from a waste stream to lower the effluent discharge to less than 1 ppm and preferably less than 0.1 ppm of silver.

It is another object of this invention to provide an efficient process for removing complexed silver ions from a waste stream to lower the effluent discharge to less than 1 ppm silver by adsorbing the complexed silver ions on a selective adsorbent.

It is yet another object of this invention to provide an efficient process for selectively removing complexed silver ions present in an anion from a waste stream by selectively adsorbing the complexed silver ions on an adsorbent to lower the subsequent effluent discharge to less than 1 ppm silver.

It is a further object of this invention to provide an efficient process for selectively removing complexed silver ions present in an anion from a waste stream by selectively adsorbing the complexed silver ions on an adsorbent to lower the subsequent effluent discharge to less than 1 ppm silver and then stripping the silver ions from the adsorbent to recover the silver.

It is yet a further object of this invention to provide an efficient process for selectively removing complexed silver ions present in an anion from a waste stream by selectively adsorbing the complexed silver ions on an adsorbent to lower the subsequent effluent discharge to less than 1 ppm silver, stripping the silver ions from the adsorbent to recover the silver, and then reducing the recovered silver to metallic silver.

These and other objects of the invention will be apparent from the following description and accompanying drawings.

In accordance with the invention, an improved process is provided for the efficient removal and recovery of silver from an impure solution containing complexed silver ions which comprises contacting the silver-containing solution with an activated alumina based adsorbent, e.g. activated alumina, activated alumina and zeolite or hydratalcite, to selectively adsorb the complexed silver ions from the solution to lower the subsequent effluent discharge to less than 1 ppm silver, treating the activated alumina with a regeneration fluid to recover the silver ions from the adsorbent, and reducing the recovered silver ions to metallic silver.

DETAILED DESCRIPTION OF THE INVENTION

Figure 1:
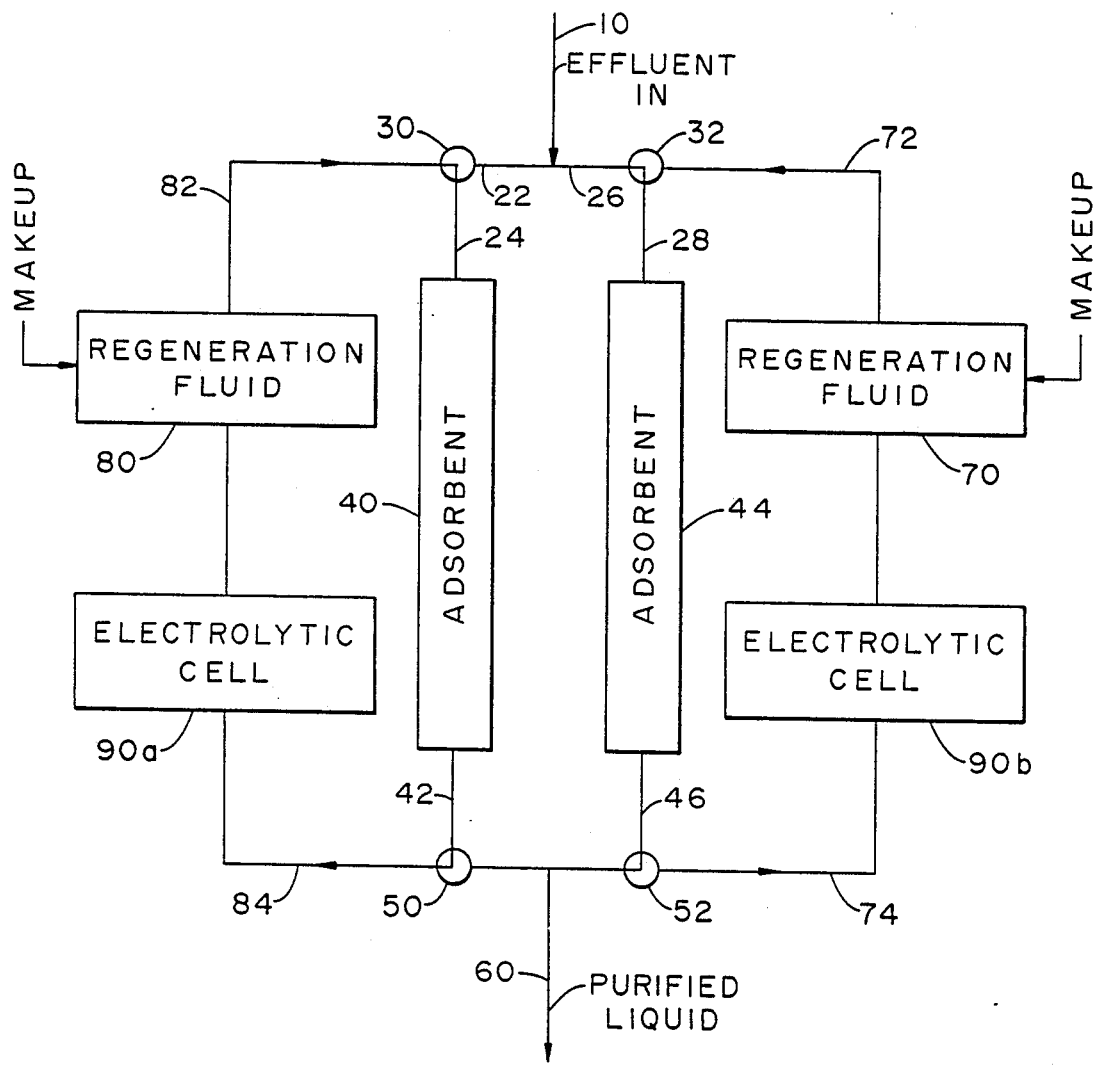
FIG. 1 is a diagramatic depiction of the process of the invention.
Figure 2:
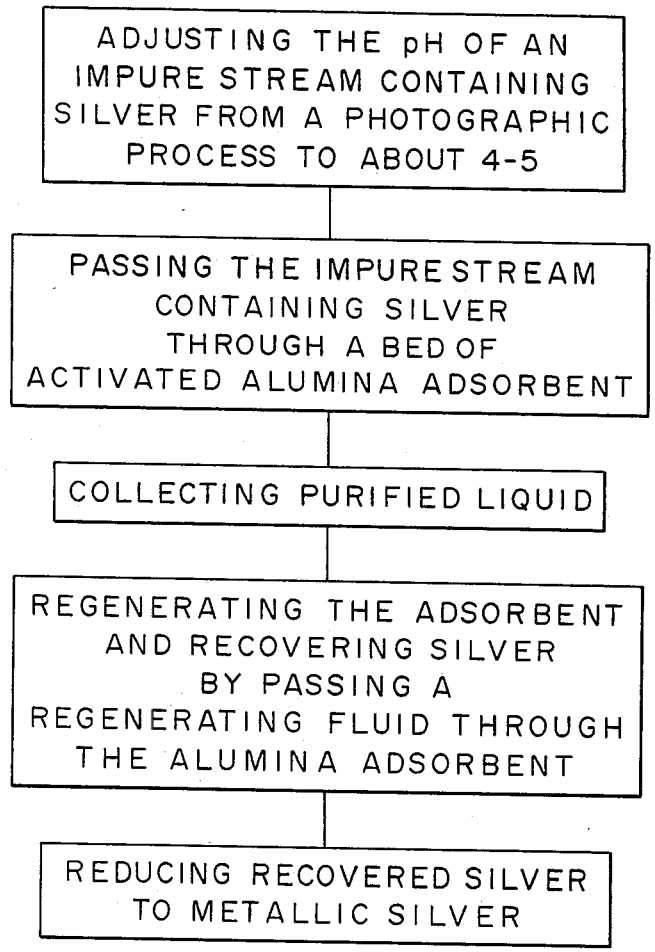
FIG. 2 is a flowsheet illustrating the process of the invention.

The process of the invention provides for the removal of sufficient complexed silver ions from a process stream to provide an effluent stream containing less than 1 ppm, preferably 0.1 ppm, silver by contacting a stream containing up to 500 ppm silver with an alumina based adsorbent. The adsorbent will selectively adsorb silver ions even when the silver is present in an anion complex with thiosulfates. The silver is subsequently stripped from the adsorbent by passing a fluid such as an acid, base or salt solution through the adsorbent bed to regenerate the adsorbent. The stream of regeneration fluid, which will contain a high concentration of silver ions, may then be passed to a reduction zone, such as an electrolytic reduction cell, to reduce the silver to permit recovery of metallic silver.

Activated alumina useful in the process of this invention may comprise an alumina which has been activated by heating the alumina for at least one hour at 400° to 500° C., preferably about 450° C. The activated alumina is characterized by a surface area greater than 250 m$^2$/g, a pore volume greater than 0.4 cc/g, an average pore diameter of 60 to 100 Angstroms, 93 wt. % or higher $Al_2O_3$ content, a low $Na_2O$ content of 0.4 wt. % or less, e.g., 0.1, a 4 to 8 wt. % loss on ignition (250° to 1200° C.), a crush strength above 10 lbs, a loose bulk density of about 31 lb/ft$^3$, and a packed bulk density of about 49 lb/ft$^3$. Such an activated alumina is commercially available under the trademark SELEXSORB-M or CPN from the Aluminum Company of America.

The particle size of the activated alumina adsorbent may range from about ¼ inch down to about −80 to +100 mesh (Tyler), preferably −28 to +48 mesh. This permits high mass transfer without significant pressure drop in packed beds. The particles may be in granular form with variable shapes or of uniform shapes such as spheres. They may be prepared by a variety of forming processes such as ball forming in a pan-type agglomerator, agglomeration in a fluidized bed, extrusion, tabletting, or other similar techniques.

The activated alumina adsorbent may be used in packed beds in granular form in order to keep the pressure drop across the bed fairly low. Although the process of the invention will be so illustrated, it must be noted that, alternatively, the adsorbent may be used in a fluidized bed or in any other form which will permit contact between the adsorbent and the aqueous solution to be purified.

Aqueous solutions containing unacceptable levels of silver ions may be purified, in accordance with one embodiment of this invention, by first adjusting the pH to about 4 to 5 and then passing the solution through a packed bed of the above described particulated activated alumina adsorbent.

The flow rate of the solution through the packed bed should be adjusted to provide about 5 to 60 minutes, preferably about 15 minutes, of residence or contact time in the bed, i.e., the solution flow rate per hour should range from about 0.5 to 12 times the volume of the bed, preferably about 4 times the volume of the bed. Thus, if it is desired to increase the flow rate through the bed, the corresponding volume of the bed should be increased to maintain the residence time to insure adequate stripping of the silver ions from the solution by the adsorbent.

This amount of contact time has been found to be sufficient to substantially remove all of the silver typically present, for example, in wash water from photographic development processing, i.e., about 5 to 500 ppm total complexed silver ion concentration. When such a solution is processed in accordance with the invention, substantially all of the complexed silver ions in the solution are removed. The term "substantially all", as used herein, is intended to mean that the concentration of complexed silver ions left in the solution after passing through the adsorbent bed is less than about 1 ppm. Preferably, the amount of complexed silver ion left in the solution after passing through the adsorbent bed is less than about 0.1 ppm If a concentration of silver ions in the solution to be purified is higher than, for example, 500 ppm, the contact time may be increased by enlarging the volume of the bed or beds or, more simply, by decreasing the flow rate through the bed or beds to extend the residence time. Alternatively, the solution may be passed through the adsorbent bed one or more additional times. However, if an adequate residence time has been provided, additional passes through the adsorbent should be unnecessary.

When the capacity of the adsorbent to adsorb silver ions is reached, the adsorbent may be regenerated and the silver recovered by passing a regeneration fluid through the adsorbent. A number of different materials may be used for this purpose with the pH of the regeneration fluid adjusted to maximize stripping of the silver ions from the activated alumina adsorbent while minimizing attack of the adsorbent. Any acid or base may be used as the regeneration fluid such as, for example, sulfuric acid or nitric acid at a pH of less than 1 or ammonium hydroxide at a pH of 7 to 9, providing that the acid or base is capable of stripping the silver from the alumina adsorbent without attacking the adsorbent. By not attacking the adsorbent is meant a regeneration fluid which will dissolve less than 1 wt. % of said adsorbent. Examples of other regeneration fluids which may be used to strip the silver from the adsorbent to regenerate the activated alumina adsorbent include, for example, potassium cyanide at a pH of 8 to 10, sodium sulfate at a pH of 4 to 5 and thiourea at a pH of about 2.0 or less.

After the silver is adsorbed on the alumina based adsorbent as a complexed silver ion, the silver may be precipitated as $Ag_2S$ by treating the adsorbent with an acid solution, e.g., 1 wt. % $HNO_3$ solution, the precipitated $Ag_2S$ still remaining on the adsorbent surface. The $Ag_2S$ precipitate may be removed from the adsorbent surface by treating with $FeCl_3$, for example, which converts it to AgCl. The AgCl is soluble in a mixture of thiourea and sulfuric acid and thus can be removed from the adsorbent surface in this way. Alternatively, the $Ag_2S$ may be removed directly from the adsorbent surface with a thiourea- or cyanide-containing solution.

Usually, the amount of regeneration fluid needed to strip substantially all of the silver ions from the adsorbent, i.e., about 95 wt. %, will be about 2 to 4 times the bed volume of the adsorbent. Preferably, the amount of regeneration fluid used will not exceed about 3 bed volumes to provide a fairly concentrated solution of silver ions in the regeneration fluid to facilitate recovery of the silver, as will be discussed below. The regeneration fluid may be passed through the adsorption bed in the same direction as the silver-containing solution or, preferably, the regeneration fluid may be passed through the bed in a direction countercurrent to the normal flow of the impure solution through the bed.

The regeneration fluid, in accordance with the invention, is passed from the adsorption bed to a reducing stage wherein the silver ions stripped from the adsorbent and present in the regeneration fluid are reduced to metallic silver and recovered. This may be carried out chemically by introducing another metal into the regeneration fluid which is more electro-negative in the electromotive-force series than silver. More conveniently, though, the silver may be reduced by feeding the regeneration fluid into an electrolysis cell and passing a current between the electrodes therein to reduce the silver ions to metallic silver which can then be collected from the cell.

Turning now to FIG. 1, the process of the invention will be shown by way of illustration and not of limitation. In FIG. 1, the aqueous effluent from a photographic process containing silver ions is carried to the purification zone in a conduit 10 and passes through either conduit 22 or 26, depending upon which of the adsorbent beds is on stream at the time, as will be described.

When bed 44 is on stream, as shown in FIG. 1, the flow passes through conduit 26 to a three-way valve 32 which is set to direct the flow through conduit 28 to adsorbent bed 44. The purified effluent liquid emerges from bed 44 through conduit 46 from which it flows through three-way valve 52 to exit conduit 60 from which it may be discharged as a purified liquid.

When the adsorbent capacity of the adsorbent in either bed 40 or bed 44 has been reached, the flow may be redirected to the other bed by turning three-way valves 30 and 32, as well as valves 50 and 52 to the appropriate positions. The adsorbent in the full bed may then either be discarded or, preferably, will be regenerated.

To generate adsorbent bed 40 and recover the adsorbed silver, three-way valves 30 and 50 are set, as shown in FIG. 1, to permit regeneration fluid from reservoir 80 to flow through conduit 82, valve 30 and conduit 24 into adsorbent bed 40 and then out conduit 42 through valve 50 into conduit 84 to electrolytic reduction cell 90a and then back to reservoir 80. While the flow of regeneration fluid through the adsorbent bed is illustrated as flowing in the same direction as the impure solution containing silver, it must be noted that the regeneration fluid may also be circulated through the adsorbent bed countercurrent to the normal direction of flow, in which case the electrolytic cell will be connected to the normal entry position for the bed and the regeneration fluid reservoir will be connected to the normal exit port from the adsorbent bed.

Electrolytic cell 90a may comprise any conventional electrolytic cell wherein a current is passed between two electrodes immersed in the regeneration fluid containing a concentrated amount of the silver ions stripped from the adsorbent. Depending upon the amount of regeneration fluid used, the concentration of silver ion in the regeneration fluid may be as high as 1000 to 5000 ppm silver which permits the cell to operate efficiently from a standpoint of power consumption. The electrolytic cell is capable of reducing sufficient silver to metallic silver to lower this concentration down to about less than 50 ppm dissolved silver. As shown in FIG. 1, the regeneration fluid, having such a low concentration of silver after the reduction step, may be returned back to reservoir 80 for future use. Alternatively, the fluid, after appropriate pH adjustment, could be passed through the adsorbent bed to remove the remaining amount of silver therein.

Adsorbent bed 44 may be regenerated in like manner using valves 32 and 52 to direct the flow of regeneration fluid from reservoir 70 through conduits 72 and 28 into adsorbent bed 44 and then through conduit 46, valve 52 and conduit 74 into electrolytic cell 90b and then back to reservoir 70. It should be noted that two regeneration fluid reservoirs and two electrolytic cells are illustrated only for convenience in illustrating the piping. In actual practice, both adsorbent beds may be regenerated using the same source of regeneration fluid which may then be fed into a single electrolytic reduction cell or other suitable reduction zone to reduce the recovered silver to metallic form. The intention is that one bed will be on line adsorbing effluent while the other bed is off line undergoing regeneration and silver recovery and reduction.

It will also be appreciated that the flow of the effluent o regeneration fluids through the conduits and valves may be by gravity, as illustrated, or the fluids may be fed to the beds via pumps (not shown), as will be readily apparent to those skilled in the art.

Thus, the invention provides an improved process for the efficient removal of silver from a waste stream such as a waste stream from a photographic development process by adsorbing the silver on a selective adsorbent to provide a subsequent effluent discharge containing less than 1 ppm silver. The silver may be stripped from the adsorbent to regenerate the adsorbent for reuse and to provide a concentrated stream which may be fed into a reduction zone such as an electrolytic reduction cell where the silver may be efficiently reduced and recovered as metallic silver.

The following examples are further illustrative of the invention.

EXAMPLE 1

An activated alumina was pretreated with 2 to 3 bed volumes of 1 wt. % $HNO_3$ and subsequently equilibrated with 0.025 M $NaNO_3$ electrolyte solution having pH of 4.5. A silver thiosulfate solution containing 100 mg/L silver and 1040 mg/L thiosulfate at pH 4.5 was then pumped (downflow) to a 1.5×15 cm glass column containing 16.5 g of the activated alumina. After about 25 bed volumes of throughput, silver started to break or leak through the column. The column was immediately regenerated (upflow) with 2 to 3 bed volumes of a 5 wt. % $NaSO_4$ solution at pH 4.5. More than 80 to 90% of the adsorbed silver was removed from the alumina, producing a solution of silver ions containing about 1000 to 2000 mg/L in the regeneration fluid. The regeneration fluid was fed into an electrolysis cell and metallic silver was recovered electrolytically. The column was treated with deionized water for reuse.

EXAMPLE 2

A silver thiosulfate solution containing 100 mg/L silver and 1040 mg/L thiosulfate at pH 3.5 to 4.0 was pumped (downflow) to a 1.5×15 cm glass column containing 16.5 g of activated alumina that had been pretreated with 2 to 3 bed volumes of 1 wt. % $HNO_3$. After about 80 bed volumes of throughput, silver started to break through. The column was then reused for silver thiosulfate removal. After about 15 wt. % silver accumulation in the adsorbent, the column was treated with 2 to 3 bed volumes of a 0.5 wt. % ferric chloride solution at pH 1.0, and, subsequently, with about 4 bed volumes of a 2 wt. % thiourea solution mixed with 1 wt. % sulfuric acid. A solution of silver ions, about 3500 mg/L, was produced in the thiourea containing solution, but no silver ions were found in the spent ferric chloride solution. The thiourea containing solution was passed to an electrolysis cell for metallic silver recovery. The spent ferric chloride solution was chemically oxidized for reuse. The adsorption column was treated with 1 wt. % $HNO_3$ for reuse.

Having thus described the invention, what is claimed is:

1. An improved process for the efficient removal and recovery of silver from a solution containing complexed silver ions which comprises:
   (a) contacting the silver-containing solution with an activated alumina adsorbent to selectively adsorb the complexed silver ions from said solution and to lower the subsequent effluent discharge to less than 1 ppm silver;
   (b) treating said activated alumina adsorbent with a regeneration fluid to recover said silver from said adsorbent; and
   (c) reducing said recovered silver to metallic silver.

2. The process of claim 1 wherein said step of treating said adsorbent with a regeneration fluid to recover said silver from said adsorbent and regenerating said adsorbent comprises passing at least one regeneration fluid through said bed, the fluid selected from the class consisting of acidic, basic and salt solutions capable of removing said silver from said adsorbent without damaging said adsorbent.

3. The process of claim 1 wherein said step of treating said adsorbent to a regeneration fluid to recover said silver from said adsorbent and regenerating said adsorbent comprises passing a regeneration fluid through said bed selected from the class consisting of sulfuric acid, nitric acid, ammonium hydroxide, potassium cyanide, sodium sulfate, thiourea at a pH level at which said regeneration fluid will remove said silver from said adsorbent without damaging said adsorbent.

4. An improved process for the efficient removal and recovery of silver from a solution containing complexed silver ions which comprises:
   (a) contacting the silver-containing solution with an adsorbent selected from the class consisting of activated alumina, activated alumina and zeolite, and activated alumina and hydrotalcite to selectively adsorb the complexed silver ions from said solution and to lower the subsequent effluent discharge to less than 1 ppm silver;
   (b) treating said adsorbent with a regeneration fluid selected from the class consisting of acidic, basic, and salt solutions capable of removing said silver from said adsorbent without damaging said adsorbent to recover said silver from said adsorbent; and
   (c) reducing said recovered silver to metallic silver.

5. The process of claim 4 including the additional step of adjusting the pH of said solution to about 4 to 5 prior to contacting said solution with said adsorbent.

6. The process of claim 4 wherein said step of contacting said solution with adsorbent comprises contacting said solution with an alumina which has been activated by heating alumina to a temperature of from about 400° to 500° C. for at least 1 hour.

7. The process of claim 6 wherein said activated alumina is further characterized by a surface area greater than 250 $m^2/g$, a pore volume greater than 0.4 cc/g, and an average pore diameter of 60 to 100 Angstroms.

8. The process of claim 7 wherein said activated alumina is further characterized by a 4 to 8 wt. % loss on ignition at 250° to 1200° C., a crush strength above 10 lbs, a loose bulk density of about 31 lbs/ft, and a packed bulk density of about 49 lbs/ft.

9. The process of claim 8 wherein said step of contacting said solution with activated alumina adsorbent comprises contacting said solution with an activated alumina in a particulate form having a particle size range of from about ¼ inch down to about −80 to +100 mesh Tyler.

10. The process of claim 9 wherein said step of contacting said solution with activated alumina adsorbent in particulate form further comprises passing said impure solution through a packed bed of said particulate activated alumina.

11. The process of claim 10 wherein the step of contacting said solution with activated alumina by passing said solution through a packed bed of said activated alumina further comprises passing said solution through said packed bed at a flow rate sufficient to provide a contact time of about 5 to 60 minutes.

12. The process of claim 10 wherein the step of contacting said solution with activated alumina by passing said solution through a packed bed of said activated alumina further comprises passing said solution through said packed bed at a flow rate per hour of from 0.5 to 12 times the bed volume of said packed bed.

13. The process in accordance with claim 4 wherein said treating step includes subjecting said adsorbent to nitric acid at a concentration of about 1 wt. % to form a silver sulfide in the adsorption bed.

14. The process in accordance with claim 13 wherein the step of subjecting said adsorbent to nitric acid is repeated to accumulate silver sulfide in the bed.

15. The process in accordance with claim 14 wherein the silver sulfide is accumulated to a level in the range of 1 to 20 wt. % silver based on the weight of adsorbent in the bed.

16. The process in accordance with claim 15 wherein said silver sulfide is converted to a silver compound capable of being dissolved by a solution selected from the class of an acid solution of thiourea and a basic solution containing cyanide.

17. The process in accordance with claim 16 wherein the silver compound is silver chloride.

18. The process in accordance with claim 17 wherein the cyanide solution is selected from sodium and potassium cyanide.

19. The process of claim 4 wherein said step of treating said adsorbent to a regeneration fluid to recover said silver from said adsorbent and regenerating said adsorbent comprises passing a regeneration fluid through said bed selected from the class consisting of sulfuric acid, nitric acid, ammonium hydroxide, potassium cyanide, sodium sulfate, thiourea at a pH level at which said regeneration fluid will remove said silver from said adsorbent without damaging said adsorbent.

20. An improved process for the efficient removal and recovery of silver from a solution containing complexed silver ions which comprises:
   (a) contacting the silver-containing solution with an activated alumina adsorbent to selectively adsorb the complexed silver ions from said solution and to lower the subsequent effluent discharge to less than 1 ppm silver;

(b) treating said adsorbent with a regeneration fluid selected from the class consisting of sulfuric acid, nitric acid, ammonium hydroxide, potassium cyanide, sodium sulfate, and thiourea at a pH level at which said regeneration fluid will remove said silver from said adsorbent without damaging said activated alumina adsorbent; and (c) reducing said recovered silver to metallic silver.

* * * * *